United States Patent [19]

Old et al.

[11] Patent Number: 4,584,899

[45] Date of Patent: Apr. 29, 1986

[54] LOCKABLE LEVER ARRANGEMENTS

[75] Inventors: John L. Old, Kenilworth; Gorden P. Jenkins; Derek J. Bullock both of Coventry, all of United Kingdom

[73] Assignee: Massey-Ferguson Services N.V., Curacao, Netherlands Antilles

[21] Appl. No.: 707,105

[22] Filed: Feb. 28, 1985

Related U.S. Application Data

[63] Continuation of Ser. No. 382,023, May 26, 1982, abandoned.

[30] Foreign Application Priority Data

Jun. 4, 1981 [GB] United Kingdom ................. 8117088

[51] Int. Cl.[4] .......................... G05G 5/06; F16H 1/44

[52] U.S. Cl. ........................................ 74/532; 74/527; 74/710.5

[58] Field of Search ................. 74/532, 531, 529, 512, 74/527, 710.5, 478, 478.5, 513

[56] References Cited

U.S. PATENT DOCUMENTS

| | | | |
|---|---|---|---|
| 694,393 | 3/1902 | Larson | 74/512 |
| 1,898,557 | 2/1933 | McCune | 74/512 |
| 1,930,710 | 10/1933 | Dodge et al. | 74/478.5 |
| 2,465,804 | 3/1949 | Hericksen et al. | 74/512 |
| 2,484,592 | 10/1949 | Rodd | 74/513 |
| 3,292,720 | 12/1966 | Harvey | 74/710.5 |
| 3,436,981 | 4/1969 | Chiusa | 74/478.5 |
| 3,916,719 | 11/1975 | Zwerenz | 74/512 |

FOREIGN PATENT DOCUMENTS

| | | | |
|---|---|---|---|
| 96606 | 1/1961 | Netherlands | 74/710.5 |
| 4234 | of 1911 | United Kingdom | 74/512 |
| 382088 | 10/1932 | United Kingdom | 74/512 |
| 684010 | 12/1952 | United Kingdom | 74/710.5 |

*Primary Examiner*—Alexander Grosz
*Assistant Examiner*—Vinh Luong
*Attorney, Agent, or Firm*—Robert L. Farris

[57] ABSTRACT

A lockable pedal arrangement having an operating pedal (14) which is movable between raised and depressed positions to perform a function such as the operation of a differential lock in a vehicle such as a tractor. The pedal is pivotally mounted on an operating member (10) and latching means (21*a*) associated with the pedal are engageable with fixed latching formation (21*b*) on movement of the pedal to its depressed position and pivoting of the pedal relative to the operating member. Detent means (17,19) at between the pedal (14) and the operating member (10) to hold the pedal in its pivoted position relative to the operating member (10) to maintain the latching means (21*a*) and latching formation (21*b*) in engagement and thus hold the operating member (10) in its depressed position.

When used as part of a differential lock operating system the lockable pedal arrangement may be associated with a lost motion device (32) which enables the pedal to be locked in its depressed position by the latching means (21*a*) before the locking formations (54,55) of the differential lock is actually able to engage.

1 Claim, 4 Drawing Figures

LOCKABLE LEVER ARRANGEMENTS

This application is a continuation of application Ser. No. 382,023, filed May 26, 1982, now abandoned.

TECHNICAL FIELD

This invention relates to lockable pedal arrangements and in particular to such arrangements for use in operating differential locks for vehicles such as tractors.

Traditionally differential locks on tractors are brought into operation by depressing a pedal and the pedal must be held depressed by the tractor operator for as long as the operator wishes to retain the differential lock in engagement. This can be a tiring operation for the operator when the tractor is required to operate for long periods with the differential lock engaged.

DISCLOSURE OF THE INVENTION

It is an object of the present invention to provide a simple and efficient pedal arrangement in which the pedal is movable between raised and depressed positions and can be locked in its depressed position to maintain a function, such as a differential lock, in operation.

Thus according to a first aspect of the present invention, there is provided a lockable pedal arrangement comprising an operating member movable between raised and depressed positions to perform a function, a pedal pivotally mounted on the operating member, latching means associated with the pedal, a latching formation engagable by the latching means on movement of the pedal to its depressed position and pivoting of the pedal relative to the operating member, and detent means acting between the pedal and the operating member to hold the pedal in its pivoted position relative to the operating member to maintain the latching means and latching formation in engagement and thus hold the operating member in its depressed position.

Such a lockable pedal arrangement is particularly suitable for use in operating a tractor differential lock with the differential lock being arranged to be held in operating when the pedal is locked in its depressed position. As will be understood the pivoted position of the pedal when in its locked condition provides an indication (which can be either seen or felt by the operators foot) that the differential lock is engaged.

When used to operate a tractor differential lock the latching formation will be associated with the floor of the tractor which may be a cab or platform floor, or a footstep in a sit-astride trator.

Preferably a first abutment surface associated with the pedal is arranged to contact a second abutment surface associated with the latching formation when the pedal is depressed to limit the downward movement of the pedal and operating member and to tend to pivot the pedal to its locked position when fully depressed.

Preferably a third abutment surface associated with the pedal is arranged, in the event of the premature pivoting of the pedal relative to the operating member, to co-operate with an abutment surface associated with the latching formation (which may be the previously referred to second abutment surface) to deflect the pedal back towards its non-pivoted position so that the latching means of the pedal can pass-by the latching formation as the pedal is moved to its depressed position.

Frequently vehicle differential locks are of a type, hereinafter referred to as being "of the type specified", in which two sets of inter-engageable formations (for example teeth) must be engaged to lock together two parts of the differential which normally rotate relative to each other during differential action, and a differential lock actuating member is provided to move one or both sets of formations to effect said locking of the differential.

In accordance with a further aspect of the present invention there is provided a differential lock of the type specified having a operating system which includes a driver operated control (such as a foot pedal) movable between "on" and "off" positions in which the differential lock is engaged and disengaged respectively, a first linkage member operatively connected with the driver operated control, a second linkage member operatively connected with the differential lock actuating member, and a spring-powered lost-motion device inter-connecting the first and second linkage members, the spring-powered loss-motion device enabling, by deformation of the spring, the driver operated control to be moved to its "on" position even when movement of the actuating member and thus the second is prevented by non-alignment of the two sets of locking formations, the energy stored in the spring of the lost-motion device then enabling the second linkage member to he moved relative to the first linkage member to displace the actuating member and thus engage the locking formations as soon as the formations are in engageable alignment.

It will be appreciated that the above spring-powered lost-motion device is usable with a pedal arrangement in accordance with the first aspect of the present invention. When used with such a pedal arrangement the tractor operator can depress and lock the pedal in its depressed position and then rely on the energy stored in the spring of the lost-motion device to engage the differential lock as soon as the locking formations are aligned for inter-engagement.

The present invention also provides a differential lock operating system including a spring-powered lost-motion device as described above.

DESCRIPTION OF DRAWINGS

One embodiment of the present invention will now be described, by way of example, only, with reference to the accompanying drawings in which.

BEST MODE OF CARRYING OUT INVENTION

Figure 1:
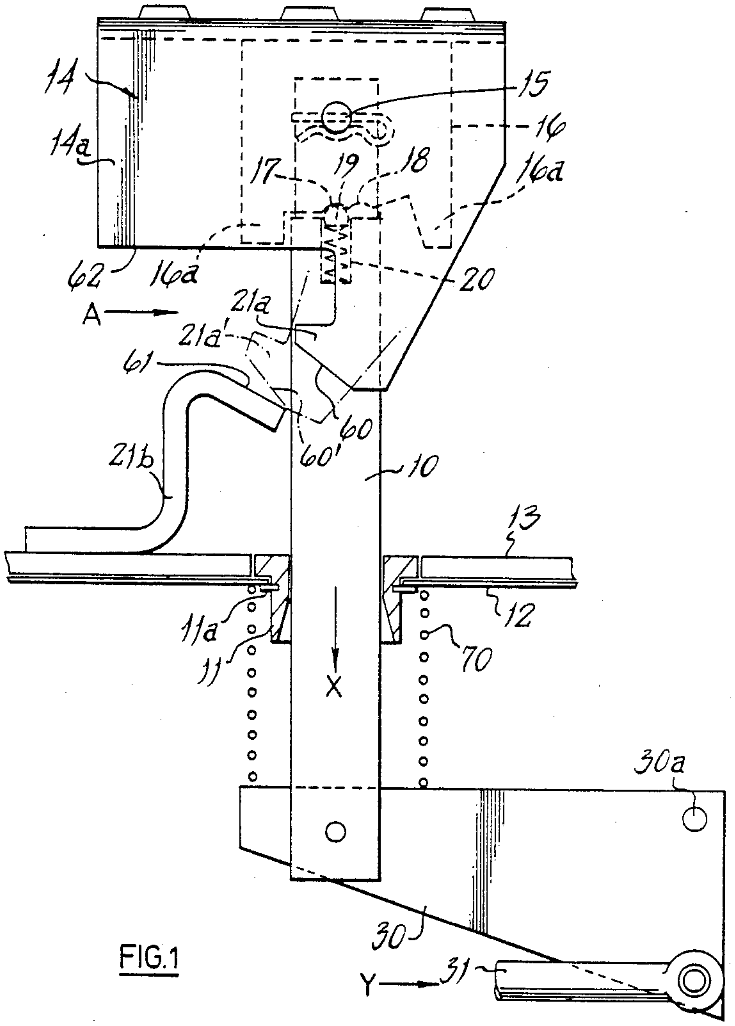
FIG. 1 shows a side view of a pedal arrangement embodying the present invention used as a tractor differential lock control pedal, the pedal arrangement being shown in the raised unlocked position.
Figure 2:
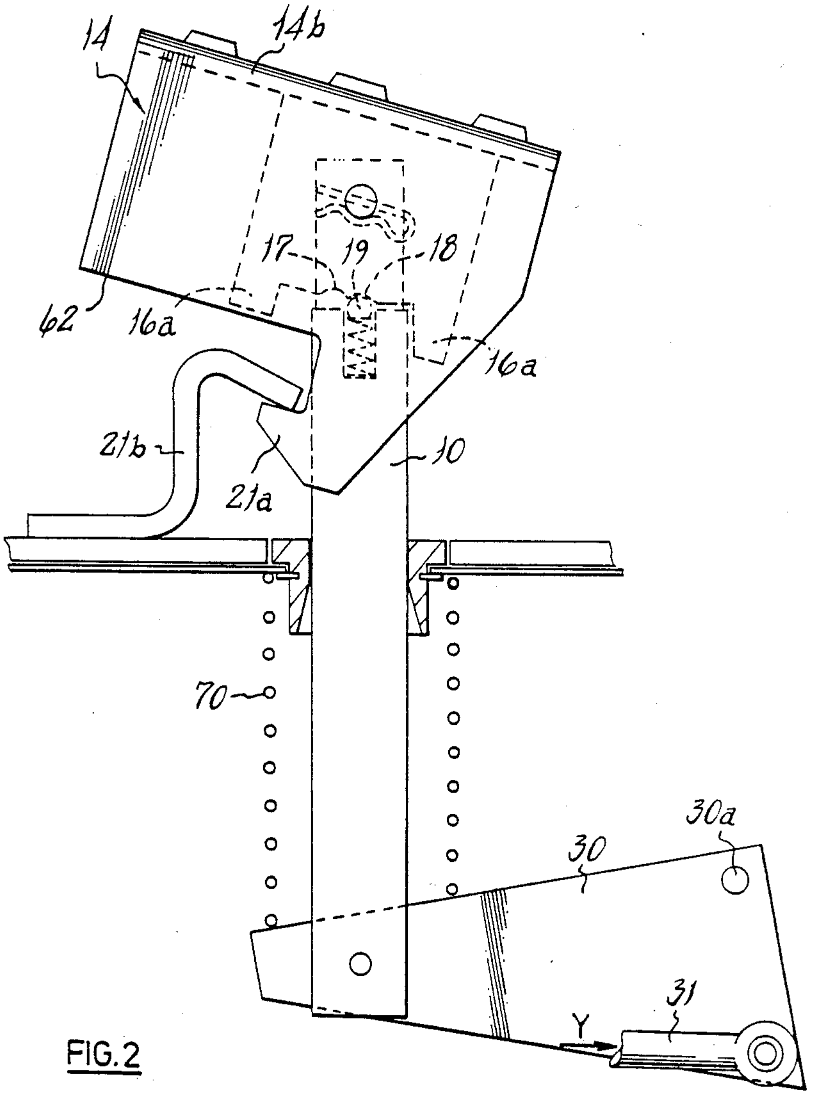
FIG. 2 shows the pedal arrangement in the depressed locked position.
Figure 3:
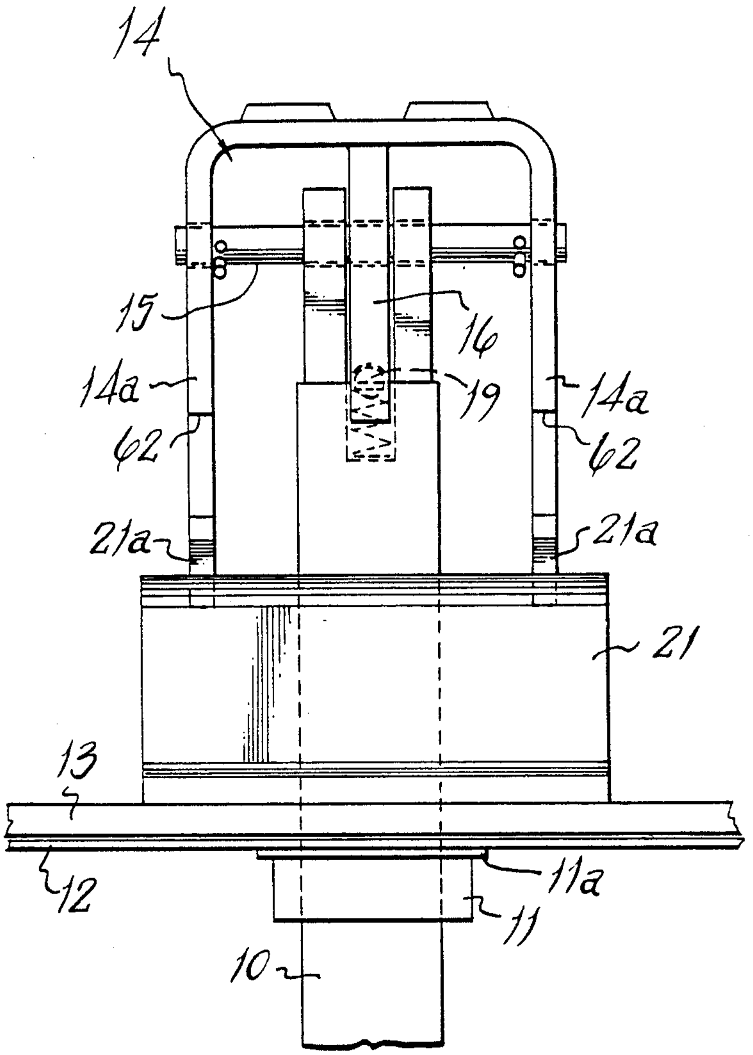
FIG. 3 is an end view in the direction of arrow A of FIG. 1 of the pedal arrangment in its raised position.

Referring to FIGS. 1 and 2, the differentiasl lock control pedal arrangement comprises an operating rod 10 which is vertically movable between the raised position shown in FIG. 1 and a depressed position shown in FIG. 2. The rod 10 is supported for movement between its raised and depressed positions by a nylon bush 11 which is carried by the floor 12 of the operators station. This floor may be a cab or platform floor or, in a sit-astride tractor, a footplate. In the installation shown, which is for a cabbed tractor, a rubber mat covers the floor with the top of the boss 11 flush with the upper surface of the mat. A circlip or snap-ring 11*a* retains the bush 11 in position.

A pedal 14 of generally inverted U-shaped configuration is pivotally mounted on the slotted upper end of rod 10 by a pin 15 which extends through a central plate 16 which is welded to the underside of the pedal and through the two pedal arms 14*a*. As can be seen from the dotted detail of FIGS. 1 and 2, the lower edge of the plate 16 is provided with two detent recesses 17 and 18 which co-operate with a spring-loaded detent ball 19 carried in a bore 20 in the top portion of the rod 10.

With the ball 19 in engagement with detent recess 17 the pedal is in its upight position (as shown in FIG. 1) and with the ball 19 in engagement with recess 18 the pedal is in its rotated or locked position (as shown in FIG. 2). Downwardly projecting portions 16*a* of the plate limit the angular pivotability of the pedal relative to the rod 10.

Arms 14*a* of the pedal are each provided with a latch 21*a* which is engageable under a latch plate 21*b* secured to the floor 12 to hold the pedal in its depressed position when the pedal is rotated to its locked position, as in FIG. 2.

Figure 4:
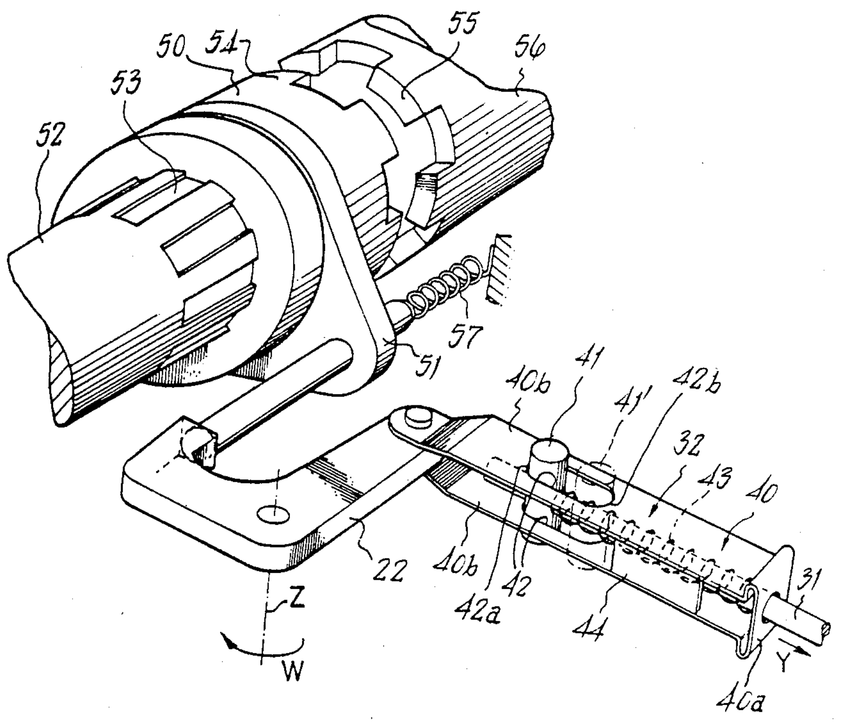
FIG. 4 diagrammatically shows a further part of a differential lock operating system which is connected with the pedal arrangement of FIGS. 1 to 3 and which includes a spring-powered lost-motion device.

Rod 10 is connected with a bell-crank 30 which is pivoted at 30*a*. Bell-crank 30 is in turn connected with a generally horizontally extending rod 31, which includes a spring-powered lost-motion device 32, and which is connected with a pivotable arm 22 shown in FIG. 4. Thus downward movement of rod 10 in direction X causes horizontal displacement Y of rod 31 and pivoting of arm 22 about axis Z as indicated by arrow W in FIG. 4. This pivoting of arm 22 is arranged to result in axial movement of a toothed locking sleeve 50 (or some other differential locking member), via an actuating member in the form of a selector fork 51, to lock together in the known manner two normally relatively rotatable parts of the tractor differential to lock-up the differential.

In the example illustrated, sleeve 50 is splined onto shaft 52 at 53 and shaft 52 carries one of the differential pinion gears. The teeth 54 of sleeve 50 are engageable with corresponding teeth 55 of part of the crown wheel support cage 56 against a spring bias shown diagrammatically at 57.

Lost-motion device 32 includes an outer cage 40 which encompasses the end of rod 31 and is pivotally connected with arm 22. A cross-head 41 is threaded onto the end of rod 31 and extends through slots 42 in cage 40, a coil, spring 43 acts between the cross-head 41 and the end 40*a* of the cage. Two plates 44 welded between the limbs 40*b* of the cage prevent buckling of the spring.

Thus if rod 31 is pulled in direction Y the force to pivot arm 22 in direction W is transmitted to the cage 40 via spring 43. If the toothed locking sleeve (or other differential locking member) operated by arm 22 is in condition in which it is free to axially move (that is its locking teeth 54 are aligned with teeth 55) the arm 22, rod 31 and cage 40 remain in the same relative position shown in FIG. 4 with the cross-head 41 at ends 42*a* of the slots as rod 41 is pulled. If however the arm is not free to move, such as for example when the teeth are not aligned, the rod 31 moves relative to the cage 40 so that the spring 43 is compressed and the cross-head moves to ends 42*b* of the slots as shown by dotted detail 41 in FIG. 4. As soon as the locking teeth 54, 55 are aligned, the arm 22 will become free to move under the action of the energy stored in spring 43 to lock the differential.

Thus the provision of the lost-motion device 32 enables the tractor operator to depress and lock pedal 14 in its depressed position and then rely on spring 43 to engage the differential lock as soon as the locking teeth 54,55 are aligned to allow axial movement of the locking sleeve 50. Without the lost-motion device it would be necessary for the tractor operator to maintain a downward pressure on the pedal 14 until the locking teeth 54,55 had aligned, a process which may take some seconds, whereupon the operator can then complete the depression of the pedal 14 and its pivoting to its locked position.

An additional coil spring 70 is provided between bell-crank 30 and floor 12. This spring, in addition to providing a further return bias on the linkage, acts to stabilise the linkage when the pedal 14 is in the released FIG. 1 position and thus reduce rattling of the pedal 14 and rod 10.

The differential lock pedal arrangement described above operates as follows. To engage the differential lock the tractor operator depresses pedal 14 which moves support rod downwardly in direction X. If during the depression of the pedal 14 the operator inadvertantly pivots the pedal to the locked position before the pedal latches 21*a* are below the latch plate 21*b* as indicated by dotted deail 21*a* in FIG. 1, inclined abutment surfaces 60 on the latches contacts the upper surface 61 of the latch plate 21*b* and deflect the pedal 14 back into the unlocked position with the spring detent ball 19 engaged in recess 17. This ensures that the latches 21*a* can always pass beneath the latch plate 21*b*.

The downward movement of the pedal 14 is limited by the contact of downwardly facing abutment surfaces 62 on the pedal with the upper surface 61 of the latch plate 21*b*. In view of the generally downward incliona-tion of surface 61, contact with abutments 62 tends to pivot the pedal to its locked position thus helping the operator to achieve a locked condition of the pedal with less conscious effort to pivot the pedal relative to the support rod 10.

FIG. 2 shows the pedal 14 in its locked depressed position. As will be appreciated the downward movement of rod 10 which takes place if the pedal moves to the FIG. 2 position causes anti-clockwise pivoting of the bell-crank 30 from the FIG. 1 position to the FIG. 2 position. This in turn moves the rod 31 in direction Y and, as previously described, moves the teeth 54 and 55 into engagement via the lost motion device 32, arm 22 and selector fork 51.

In order to release the differential lock, the operator pivots the pedal 14 in an anti-clockwise sense from the locked position shown in FIG. 2. This may be achieved simply by applying pressure to the rear portion 14*b* of the pedal. Once the latches 21*a* have disengaged the latch plate 21*b*, which results in the spring detent ball 19 entering recess 17, the pedal 14 and support rod 10 are free to rise to the raised disengaged position, shown in FIG. 1, under the action of springs 57 and 70 resulting in the disengagement of the differential locking teeth 54 and 55.

The present invention thus provides a simple but efficient lockable pedal arrangement which is particularly suitable for the control of a differential lock and also a spring-powered lost-motion device which enables the differential lock operating pedal to be locked in its depressed position before the locking teeth 54, 55 of the differential lock have actually engaged. As previously explained this latter feature significantly reduces the time which the tractor operator must give to the operation of the differential lock pedal when engaging the differential lock.

We claim:

1. A lockable pedal actuator comprising a pedal mounted on an operating member, the pedal and operating member being together moveable by the application of foot pressure between raised and depressed positions to actuate a device and the pedal being pivotable relative to the operating member between a normal position and a pivoted position, a latching means connected with the pedal and moveable with the pedal relative to the operating member, a latching formation for cooperation with the latching means only when the pedal is in its pivoted position and the operating member and pedal are in their depressed position to hold the pedal and operating member in said depressed and pivoted positions, a first abutment surface associated with the pedal and arranged to contact a second abutment surface associated with the latching formation when the pedal and operating member are moved to their depressed position, the first and second abutment surfaces being shaped to provide a cam action on contact with each other which tends to pivot the pedal to engage the latching formation and to provide a stop to limit the downward movement of the pedal and operating member, a third abutment surface associated with the pedal and arranged, in the event of premature pivoting of the pedal relative to the operating member during movement of the pedal and operating member towards their depressed position, to cooperate with an abutment surface associated with the latching formation to deflect the pedal back towards its non-pivoted position so that the latching means of the pedal can pass-by the latching formation as the pedal and operating member are moved to their depressed position, and detent means for selectively holding the pedal in its pivoted position to maintain the latching means in engagement with the latching formation or in its normal position so that when the pedal is pivoted to its normal position to disengage the latching formation and to allow the pedal and operating member to rise to their raised position the detent means can maintain the pedal in its normal position, the difference in the inclination of the pedal relative to the operating member when in its normal and pivoted positions respectively being sufficiently large to be detectable by the operators foot to provide a clear indication as to when the pedal and operating member are being held in their depressed position.

* * * * *